United States Patent
Frohnhaus et al.

(10) Patent No.: US 6,502,798 B1
(45) Date of Patent: Jan. 7, 2003

(54) SEAT FRAME OF AN ADJUSTABLE SEAT IN A VEHICLE

(75) Inventors: Ernst-Reiner Frohnhaus, Solingen (DE); Burckhard Becker, Solingen (DE); Wilfried Beneker, Leichlingen (DE)

(73) Assignee: C. Rob. Hammerstein GmbH KG, Solingen (DE)

(*) Notice: Subject to any disclaimer, the term of this patent is extended or adjusted under 35 U.S.C. 154(b) by 0 days.

(21) Appl. No.: 09/351,941

(22) Filed: Jul. 12, 1999

(30) Foreign Application Priority Data

Aug. 12, 1998 (DE) .......................... 198 36 425

(51) Int. Cl.⁷ ............... F16M 13/00; A47C 1/025
(52) U.S. Cl. ............... 248/422; 248/421; 297/344.15
(58) Field of Search ............... 248/419, 421, 248/422, 424, 429; 297/344.15, 344.17, 344.12, 344.13, 344.1; 296/65.01

(56) References Cited

U.S. PATENT DOCUMENTS

| | | | | |
|---|---|---|---|---|
| 4,770,463 A | * | 9/1988 | Nishino | 297/344.1 |
| 5,275,457 A | * | 1/1994 | Satoh et al. | 248/419 |
| 5,573,219 A | * | 11/1996 | Chinomi | 248/421 |
| 5,707,035 A | * | 1/1998 | Kargol et al. | 248/429 |
| 5,909,866 A | * | 6/1999 | Vaidyanathan et al. | 248/429 |

* cited by examiner

Primary Examiner—Anita King
Assistant Examiner—Jon Szumny
(74) Attorney, Agent, or Firm—John Lezdey

(57) ABSTRACT

Seat frame of an adjustable seat in a vehicle with a seat carrier having two side parts and one rear tie-bar, and provided with at least one transverse shaft for the transmission of an adjusting movement from one side of the seat to the other, said transverse shaft being borne in the two seat parts and having for each seat side an adjusting arm fastened on it. At least one side part is provided with a location recess—preferably open in its bottom part—and is freely receiving the transverse shaft 26, in the side part, beside the location recess, first fastener are provided and the transverse shaft is encompassed by a bearing part—preferably between the adjusting arms fastened on the shaft—, said bearing part bearing the transverse shaft 26, bridging the location recess and constituting second fastener corresponding to the first fastener.

12 Claims, 3 Drawing Sheets

SEAT FRAME OF AN ADJUSTABLE SEAT IN A VEHICLE

FIELD OF THE INVENTION

The invention relates to a seat frame of an adjustable seat in a vehicle with a seat carrier having two side parts and one rear tie-bar and provided with at least one transverse shaft for the transmission of an adjusting movement from one side of the seat to the other, said transverse shaft being borne in the two seat parts and having for each seat side an adjusting arm fastened on it.

BACKGROUND OF THE INVENTION

According to the state of the art, seat frames are made as weldment. That means that each side part is welded with the rear tie-bar, for example by spot weldings. A stable construction is thus achieved that meets the practical requirements.

A seat frame of the type mentioned above made in such a weldment technique has the disadvantage to be quite difficult to produce. The different parts have indeed to be all brought together before they are welded. The transverse shaft for example has to be installed before the two side parts may be attached to the rear tie-bar. According to the state of the art, it is not possible to use a through part that would combine in one piece the two side parts as well as the rear tie-bar since the mounting of the at least one transverse shaft cannot be realized.

The construction according to the state of the art entails that, once mounted and welded, a seat carrier cannot be changed any more. This entails that the complete seat carrier of the seat frame has to be made entirely during the mounting and welding procedure; there is no possibility of working with subassemblies. When the seat carriers have different outfits, for example with and without adjustment, the complete seat carriers have to be assembled. That means that for different outfits different assembling and welding stations are required too.

When a finished seat carrier is provided with the corresponding bores for the bearing of a transverse shaft, the transverse shaft may also be mounted subsequently if it may still be pushed-in freely in axial direction. This however means that the adjusting arms that have to be fastened on the shaft have to be retrofitted. This again makes the mounting procedure even more difficult.

SUMMARY OF THE INVENTION

That is where the invention is brought to bear. Its object is to develop a seat carrier of a seat frame of the type mentioned above in such a way that a retrofitting of a transverse shaft into a finished seat carrier is possible, that's to say that it may be designed in modular system.

On the basis of the seat frame mentioned above, the solution of the invention is to provide at least one side part with a location recess—preferably open in its bottom part—that freely receives the transverse shaft, to provide in the side part, beside the location recess, first fastening means and to have the transverse shaft encompassed by a bearing part (preferably between the adjusting arms fastened on the shaft), said bearing part bearing the transverse shaft, bridging the location recess and constituting second fastening means corresponding to the first fastening means.

Only one side part has to be provided with a location recess, since, when retrofitting the transverse shaft, the transverse shaft may be guided obliquely in a bore for the bearing of the other side part, so that there, a location recess is not necessary. On principle though it is possible to provide both side parts with a location recess. In a preferred embodiment however, only one side part is equipped with such a location recess.

Thanks to the location recess, at least one ready-made transverse shaft may be mounted subsequently. It does not matter whether at least one of the adjusting arms is located or not between the two side parts. Usually, the two adjusting arms are located within the area defined by the two side parts. Thanks to the invention, it is also possible to arrange at least one adjusting arm also outside, that is to say on the outer side of the corresponding side part. If each side part is equipped with a location recess, both adjusting arms may be arranged on the outer side of the corresponding side part.

In each side part, the bearing part is bearing the transverse shaft together with the location recess. The bearing part may be fixed in the location recess, whereas the fixation may be done by welding, riveting, screwing and the like.

According to the invention, a seat frame may be either welded or provided with removable fastening means between the two side parts and the tie-bar or made of one piece. Usually, the seat frame has also a front tie-bar that is also connected with the two side parts in a removable or permanent relationship.

In a particularly preferred embodiment of the invention, the bearing part is located between the corresponding adjusting arm and a driving part that is for example designed as a toothed quadrant. To arrange an adjustable arm on the other side of the corresponding side part serving as driving part for the swivelling motion of the transverse shaft is, according to the state of the art, complicated, since, in case of weldment and as already mentioned above, the complete seat carrier has always to be produced. This complicated installation is now avoided and the parts may be mounted one after the other. This shows to be particularly advantageous with seat carriers equipped in different ways. The side parts and the tie-bar may thus be assembled together first without any necessity to mount the other parts. The other parts, such as for example the usually two transverse shafts and the front tie-bar, may be retrofitted. In this way, seat frames of different outfit may still be produced in the same devices in the beginning, a specialization being required only later on.

In the preferred embodiment, the transverse shaft only has one unique driving part that is assigned to one side part. In said preferred embodiment of the invention, the adjusting arm or the other side part is located on the inner side of this side part, being thus located between the two side parts. It is then possible to provide the considered side part with a bore for the bearing into which a free end of the transverse shaft may be inserted. The free end is freely projecting relative to the adjusting arm.

In a preferred development of the invention, the tie-bar is removably connected to the side parts. Thus, the tie-bar may be subsequently exchanged. This is of advantage with a tie-bar that has for example to be provided with fastening means for a child's seat, for example with a so-called Isofix-fastening. It is thus another characteristic of the invention that the tie-bar is provided with holding means for the reception of small children.

The at least one transverse shaft may either be a front transverse shaft or a rear transverse shaft. A rear transverse shaft is preferably used. A swivelling bridge is also preferably used as a means to adjust the front edge of the seat, said swivelling bridge being borne in the front area of the side parts. Said bridge may also be retrofitted.

Further advantages and characteristics of the invention will become clear in the other claims and in the description of the embodiment of the invention. The embodiment mentioned is an example and is not limiting the scope of the invention. Said embodiment is shown in the drawing with the aid of which it will be explained in more details. The drawing shows in:

DESCRIPTION OF THE PREFERRED EMBODIMENTS

Figure 1:
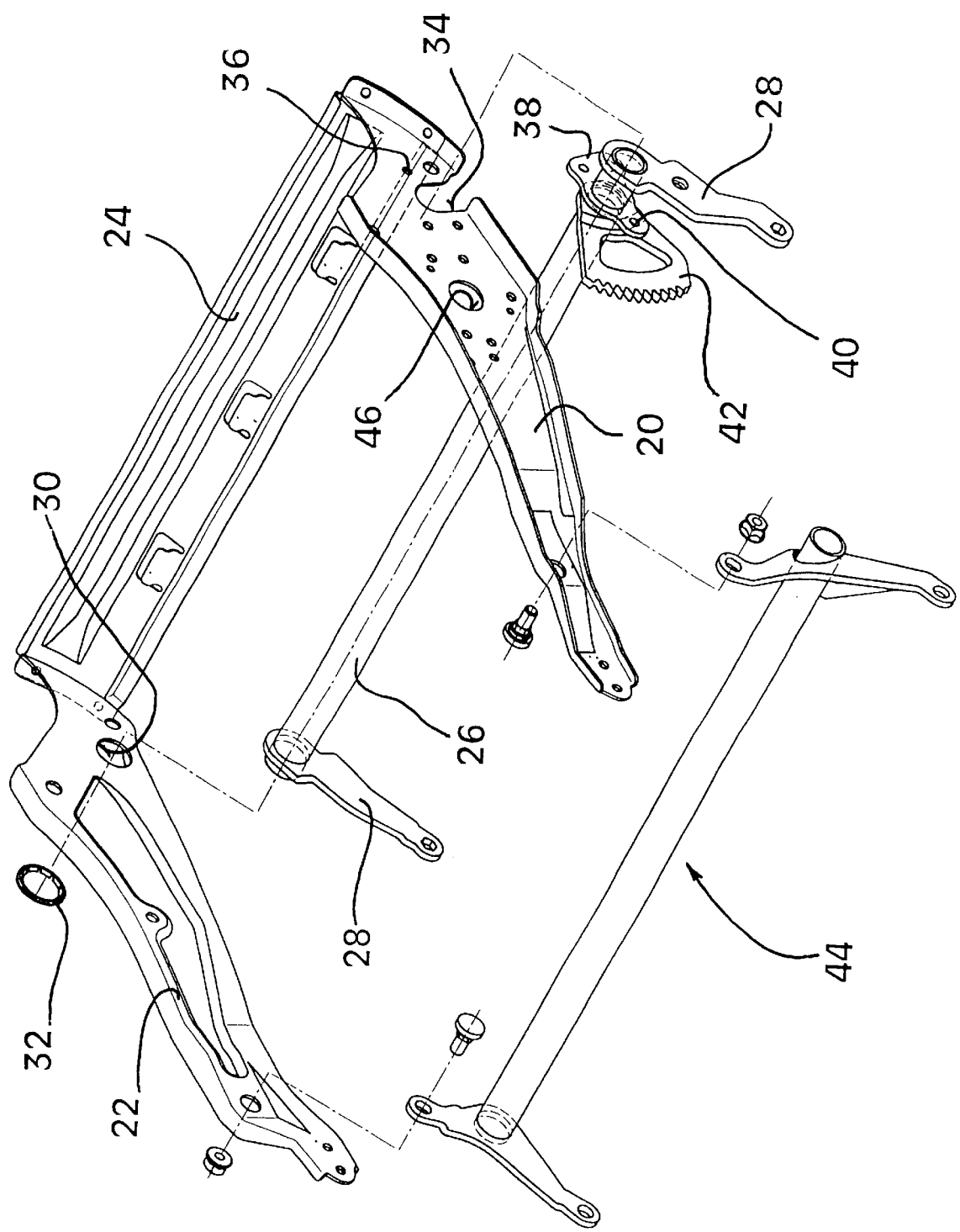
FIG. 1: an exploded view of an assembly drawing of a seat carrier for a seat frame.
Figure 2:
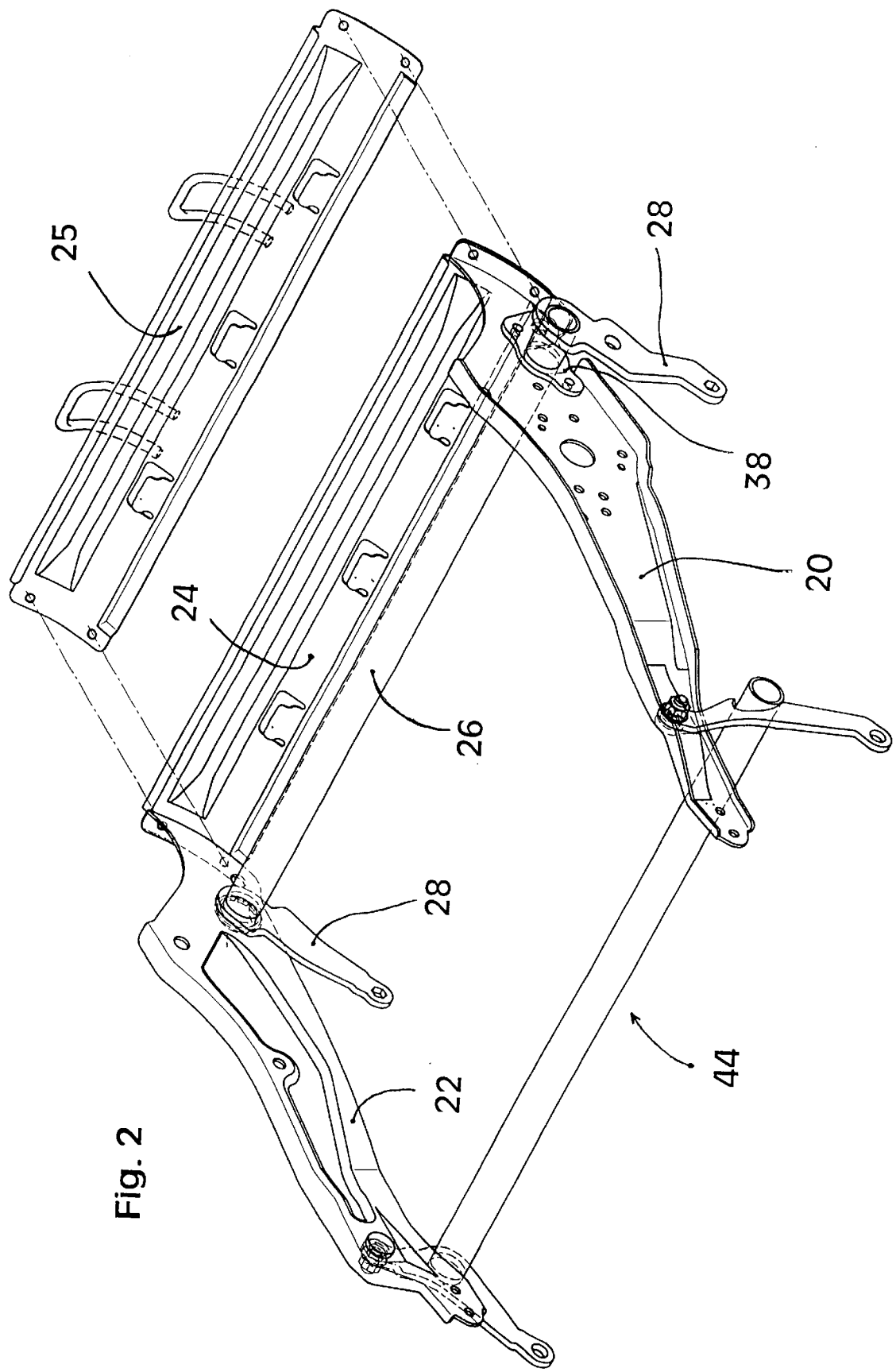
FIG. 2: a representation of the seat carrier similar to FIG. 1, but this time not in an assembly drawing but already assembled

As may be seen in FIGS. 1 and 2, the seat carrier has a left side part 20, a right side part 22 and a rear tie-bar 24. The denominations left and right as well as front and rear are always understood from the point of view of a passenger seated on the seat carrier.

The seat carrier also has a rear transverse shaft 26 on which a left and a right adjusting arm 28 are fastened, for example by welding. As may be seen in FIG. 1, the transverse shaft 26 is freely projecting beyond the right adjusting arm 28, so that this free end may by inserted in a bore for the bearing 30 of the right side part 22. The fixation occurs by means of the figured safety ring 32. The left side part 20 has a location recess 34 that is open in its lower part. To the right and left of the location recess 34, holes are provided that are referred to as first fastening means 36. A bearing part 38 is encompassing the transverse shaft 26, said bearing part bearing the transverse shaft 26 on one hand whereas on the other it constitutes second fastening means 40 also designed as holes. The bearing part 38 is bridging the location recess 34 and constitutes, after its fixation on the corresponding left side part 20, the (actually missing) bore for the bearing for the left area of the transverse shaft 26. In the embodiment shown, the bearing part 38 is located after mounting on the inner side of the left side part 20, that is to say between the two side parts 20, 22. By comparison, the left adjusting arm 28 is located on the outer side of the left side part 20.

Figure 3:
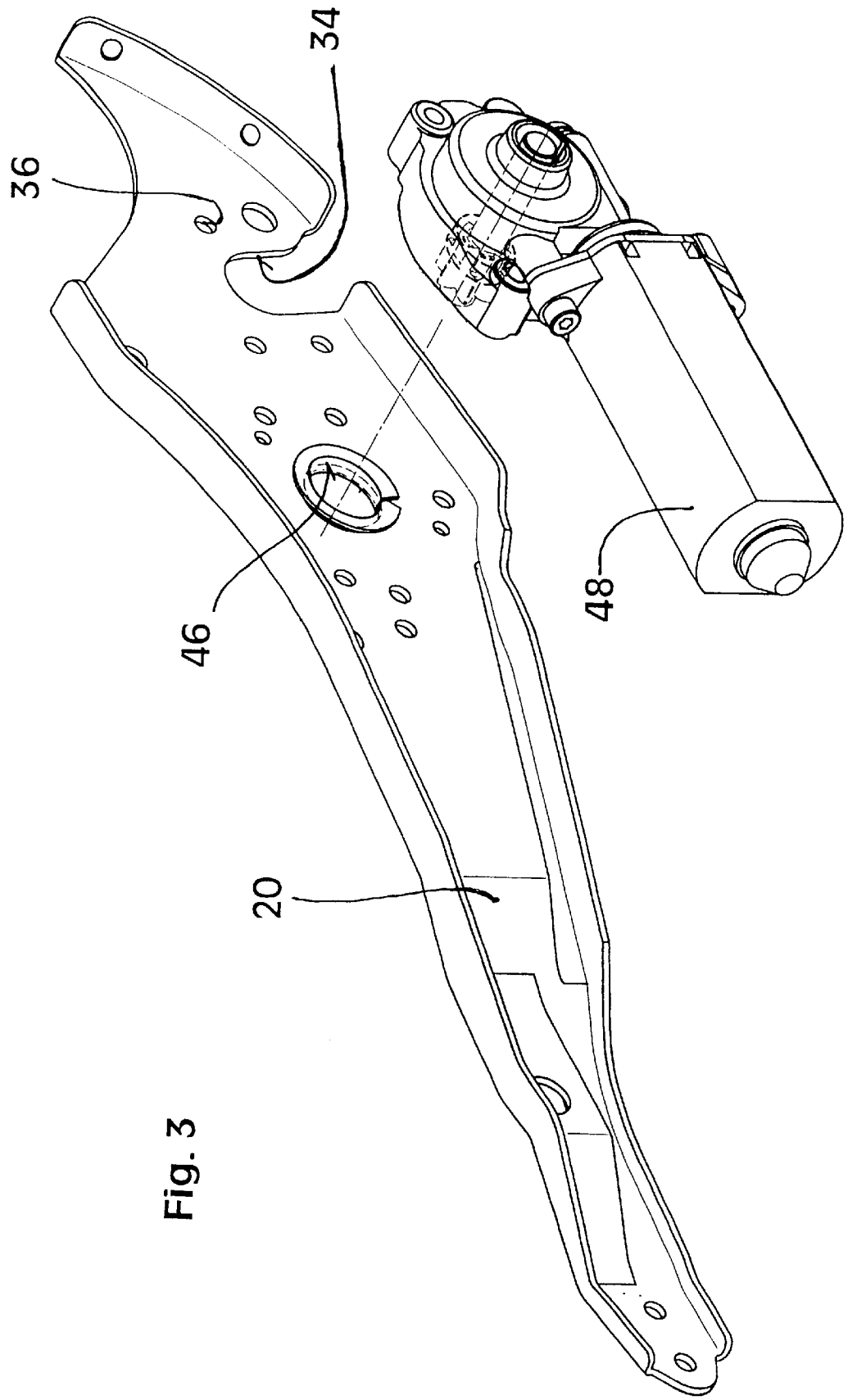
FIG. 3: an exploded view of a side part and of an electromotor.

Further inwards on the transverse shaft 26, that is to say facing the right side part 22 from the bearing part 38, a driving part 42 is connected with the transverse shaft 26. In fact it is provided with a toothed quadrant interacting with a pinion that will still be considered, see FIG. 3.

The description explained that the transverse shaft 26, together with its two adjusting arms 28, the bearing part 38 and the driving part 42, may be completely prefabricated as a modular unit. This unit may later on, as shown in FIG. 1 by the dot-dash upper mounting line, be inserted into the prefabricated unit constituted by the two side parts 20, 22 and the rear tie-bar 24.

As FIGS. 1 and 2 are showing, the rear tie-bar 24 is connected to the two side parts 20, 22 by four connection points. These connection points may be welding spots but they may also be removable, like for example screw connections. They may also be riveted. The bearing part 38 may also be connected to the border area of the location recess 34 by means of the fastening means 36, 40 by welding, riveting, screwing or the like.

As may be seen in FIG. 2, two different tie-bars 24, 25 may be used. The tie-bar 24 that is shown mounted is a normal tie-bar. It has, according to a known procedure, holding devices for receiving the seat springs extending forward. They are not shown here. By releasing the four connection points designed accordingly, the tie-bar 24 may be replaced by a tie-bar 25 provided with bows for an Isofix-fastening. This is represented by the four parallel dash-dot mounting lines. Except for the two Isofix-bows, tie-bar 25 does not differ from tie-bar 24.

FIG. 1 also shows a front swivelling bridge 44. It consists of a cross tube and two swivelling props that have each at their upper and at their lower end a bore for a bearing and that are tightly connected to each other in their center by the cross tube. This unit too may be pre-assembled and integrated subsequently into the described arrangement as it is also shown by the two lower dash-dot mounting lines. Fastening means are provided on either ends of the two mounting lines, said fastening means being in this case designed as screws and nuts.

Each front end of the two side parts 20, 22 is provided with two holes. A front tie-bar (not shown) may be arranged here.

As may be seen in FIGS. 1 and 2, the two side parts 20, 22 are mirror-inverted, but essentially similar in construction except for the area of the bore for the bearing 30 or the location recess 34. In the vicinity of the location recess 34 a hole is provided in the side part 20, said hole being designed here as bearing 46 (see FIG. 3). Several fastening holes are provided around this bearing 46. As may be seen in FIG. 3, an electromotor 48 may be flange-mounted around the bearing 46. It has the following peculiarity: its gearbox case is open in the area facing the side part 20, that is the gearbox case has no wall there. Side part 20 takes over the part of the lacking wall of the gearbox case in the area around the bearing 46. Thus weight is saved, the output shaft of electromotor 48 is borne with precision in side part 20 and the association with the driving part 42 is satisfactory.

It is also possible to insert directly into the left side part 20 an accordingly enlarged bearing part 38 instead of a bearing, said bearing part taking at the same time charge of the bearing of the output shaft of electromotor 48 and of the closing of the gearbox case.

What is claimed is:

1. A seat frame of an adjustable seat in a vehicle with a seat carrier, said seat carrier having two side parts and a rear tie-bar, said seat carrier being provided with a transverse shaft for a transmission of an adjusting movement from one of said two side parts to the other of said two side parts, said transverse shaft showing two ends, each of said two ends having an adjusting arm fastened on it, wherein one of said two side parts is provided with a location recess freely receiving the transverse shaft and with first fastening means arranged in the vicinity of said location recess, the transverse shaft is encompassed by a bearing part, said bearing part a) having means for bearing the transverse shaft, b) having a size not smaller than the size of said location recess and c) having second fastening means corresponding to the first fastening means for a fixation of said bearing part on said one side part, whereby when said bearing part is fixed on said one side part, said bearing part bridges said location recess, the other of said two side parts has a bore for a bearing of the transverse shaft, the transverse shaft presenting a bearing area corresponding to said bore.

2. The seat frame according to claim 1, wherein the bearing part is located between a driving part and the corresponding arm of one of the said two ends, which is closer to said one side part.

3. The seat frame according to claim 2, wherein said driving part is designed as a toothed quadrant.

4. The seat frame according to claim 1, wherein the adjusting arm of one of said two ends of the transverse shaft is arranged between said two side parts while the adjusting arm of the other of said two ends is arranged outside said two side parts.

5. The seat frame according to claim 1, wherein the rear tie-bar is removably connected to the two side parts.

6. The seat frame according to claim 1, wherein a front swiveling bridge is provided that has two swiveling arms a) having each a free end and b) forming each, on said free end, a swiveling bearing part, and said two swiveling arms being rigidly connected to each other by a cross link.

7. The seat frame according to claim 6, wherein one said two swiveling arms is arranged between said two side parts, while the other of said two swiveling arms is arranged outside of said two side parts.

8. The seat frame according to claim 6, wherein each of the swivelling bearing parts is formed as a bore for bearing.

9. The seat frame according to claim 1, wherein holding means for a security holding receptacle of small children are provided on the rear tie-bar.

10. The seat frame according to claim 1, wherein the bearing part is arranged on the transverse shaft between the adjusting arms fastened on said two ends of said transverse shaft.

11. The seat frame according to claim 1, wherein said location recess is open towards a bottom of said seat frame.

12. The seat frame according to claim 1, wherein said one side part which is provided th said location recess is the side part located on the outer side of said seat.

* * * * *